United States Patent
Gates (10) Patent No.: US 10,657,186 B2
(45) Date of Patent: May 19, 2020

(54) SYSTEM AND METHOD FOR AUTOMATIC DOCUMENT CLASSIFICATION AND GROUPING BASED ON DOCUMENT TOPIC

(71) Applicant: Dell Products, LP, Round Rock, TX (US)

(72) Inventor: Carrie E. Gates, Livermore, CA (US)

(73) Assignee: Dell Products, L.P., Round Rock, TX (US)

( * ) Notice: Subject to any disclaimer, the term of this patent is extended or adjusted under 35 U.S.C. 154(b) by 553 days.

(21) Appl. No.: 14/725,620

(22) Filed: May 29, 2015

(65) Prior Publication Data
US 2016/0350293 A1    Dec. 1, 2016

(51) Int. Cl.
| | | |
|---|---|---|
| G06F 17/30 | (2006.01) | |
| G06F 16/93 | (2019.01) | |
| G06F 16/28 | (2019.01) | |
| G06F 16/35 | (2019.01) | |
| G06F 16/958 | (2019.01) | |

(52) U.S. Cl.
CPC ............ *G06F 16/93* (2019.01); *G06F 16/285* (2019.01); *G06F 16/353* (2019.01); *G06F 16/94* (2019.01); *G06F 16/958* (2019.01)

(58) Field of Classification Search
CPC ...................... G06F 17/30598; G06F 17/30705
USPC .......................................... 707/738, 620, 737
See application file for complete search history.

(56) References Cited

U.S. PATENT DOCUMENTS

| | | | | |
|---|---|---|---|---|
| 7,139,974 B1* | 11/2006 | Bascom | ................ | G06F 16/288 715/236 |
| 7,747,593 B2* | 6/2010 | Patterson | ............ | G06F 16/3346 707/705 |
| 8,176,067 B1* | 5/2012 | Ahmad | ................. | G06F 16/285 707/765 |
| 8,386,487 B1* | 2/2013 | Ben-Artzi | ............... | G06F 16/35 707/737 |
| 8,423,551 B1* | 4/2013 | Ben-Artzi | ......... | G06F 17/30867 707/737 |
| 9,286,391 B1* | 3/2016 | Dykstra | ................ | G06F 16/285 707/707 |
| 9,436,758 B1* | 9/2016 | Lewis | ..................... | G06F 16/35 707/707 |

(Continued)

OTHER PUBLICATIONS

How to Limit Read Access for Different Site Visitors? Published on https://www.onehippo.org/library/concepts/security/how-to-limit-read-access-for-different-site-visitors.html?view=16d601ad-63ed-4e4a-b425-354204a0ec80 on May 13, 2015, which is version 10, modified by uhommes.*

(Continued)

*Primary Examiner* — Alexandria Y Bromell
(74) *Attorney, Agent, or Firm* — Larson Newman, LLP (57) ABSTRACT

A document handling system includes a memory and a processor, in communication with the memory, to receive first information from a first document, determine that the first document includes a first topic based on the first information, determine a first classification level of the first document, determine a first grouping of the first document, associate the first classification level and the first grouping with the first topic, receive second information from a second document, determine that the second document includes the first topic based on the second information, and modify the second document to ascribe the first classification level and the first grouping to the second document.

20 Claims, 4 Drawing Sheets

(56) References Cited

U.S. PATENT DOCUMENTS

| | | | | |
|---|---|---|---|---|
| 9,727,925 B2* | 8/2017 | Subramanian | G06Q 10/10 707/707 |
| 9,805,035 B2* | 10/2017 | Brenner | G06F 16/48 707/707 |
| 9,852,208 B2* | 12/2017 | Chari | G06F 16/285 707/707 |
| 2002/0007364 A1* | 1/2002 | Kobayashi | G06F 16/35 707/707 |
| 2010/0153318 A1* | 6/2010 | Branavan | G06F 16/35 706/12 |
| 2012/0016877 A1* | 1/2012 | Vadrevu | G06F 16/35 707/737 |
| 2012/0078719 A1* | 3/2012 | Bhagwan | G06Q 30/0241 705/14.54 |
| 2012/0143911 A1* | 6/2012 | Liebald | G06F 3/0482 707/771 |
| 2013/0318014 A1* | 11/2013 | Ismalon | G06Q 30/02 706/12 |
| 2014/0337005 A1* | 11/2014 | Abdel-Hady | G06F 16/35 704/2 |
| 2015/0006451 A1 | 1/2015 | Dayan et al. | |
| 2015/0113388 A1 | 4/2015 | Barrett et al. | |
| 2015/0149372 A1 | 5/2015 | Morimoto et al. | |
| 2015/0242486 A1* | 8/2015 | Chari | G06F 16/285 707/737 |
| 2015/0248476 A1* | 9/2015 | Weissinger | G06F 16/35 707/737 |
| 2015/0310010 A1* | 10/2015 | Brenner | G06F 16/48 707/730 |
| 2016/0342590 A1* | 11/2016 | Paulin | G06F 16/93 |

OTHER PUBLICATIONS

Uhommes, "How to Limit Read Access for Different Site Visitors," https://www.onehippo.org/library/concepts/security/how-to-limit-read-access-for-different-site-visitors.html?view=16d601ad-63ed-4e4a-b425-354204a0ec80. (Year: 2015).*

\* cited by examiner

SYSTEM AND METHOD FOR AUTOMATIC DOCUMENT CLASSIFICATION AND GROUPING BASED ON DOCUMENT TOPIC

FIELD OF THE DISCLOSURE

This disclosure generally relates to information handling systems, and more particularly relates to a system and method for automatic document classification and grouping based on document topic.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Figure 1:
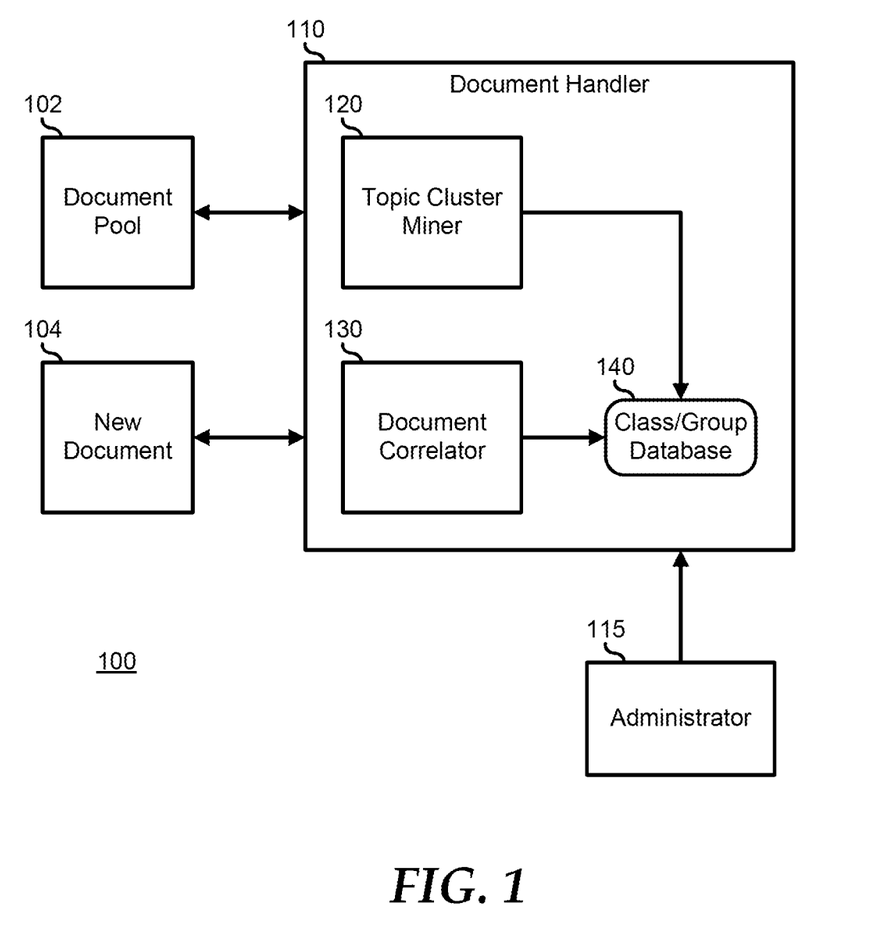
FIG. 1 is a block diagram illustrating a document handling system according to an embodiment of the present disclosure.

FIG. 1 illustrates an embodiment of a document handling system 100. For the purpose of this disclosure, document handling system 100 can be implemented by one or more information handling systems and can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system can be a personal computer, a laptop computer, a smart phone, a tablet device or other consumer electronic device, a network server, a network storage device, a switch router or other network communication device, or any other suitable device and may vary in size, shape, performance, functionality, and price. Further, an information handling system can include processing resources for executing machine-executable code, such as a central processing unit (CPU), a programmable logic array (PLA), an embedded device such as a System-on-a-Chip (SoC), or other control logic hardware. An information handling system can also include one or more computer-readable medium for storing machine-executable code, such as software or data. Additional components of an information handling system can include one or more storage devices that can store machine-executable code, one or more communications ports for communicating with external devices, and various input and output (I/O) devices, such as a keyboard, a mouse, and a video display. An information handling system can also include one or more buses operable to transmit information between the various hardware components.

Document handling system 100 includes one or more existing documents in a document pool 102, a newly created document 104, a document handler 110, and a document handling administrator 115. Document pool 102 includes documents associated with an entity or organization that include information that is controlled in terms of who has access to the information, and under what circumstances the access to the information can be granted. An example of a particular document of document pool 102 can include a text-based document, such as a scanned image of a hard copy of a text document, a file derived from a conversion of a hard copy of a text document to a digital copy of the text document, such as a text document that has been subjected to an Optical Character Recognition (OCR) process, a word processing document, or another type of text-based document according to one or more type of digital text file format as is known in the art. A document can also include an image, audio, or video media according to one or more type of digital media file format as is known in the art, and can include meta-data associated with the media that provides a title or a description for the media. A document can also include other types of information such as presentations, spreadsheets, databases, and other information according to one or more type of information file format as is known in the art. A document can also include any and all of the above information as included in a web page, as embedded in a web page, or as provided as a link in a web page. In general, as used herein, a document is meant to describe a broad range of information sources that can be evaluated as to the nature of the content included therein by one or more of the methods and systems as described herein.

In a particular embodiment, the individual documents of document pool 102 are classified by a hierarchical classification system. Here, each document of document pool 102 is ascribed a particular classification level within the hierarchical classification system, and an individual's access to a particular document is granted when the individual has a clearance level that corresponds with the classification level of the document. For example, each document of document pool 102 can be ascribed one of a Non-Confidential level, a Confidential level, a Secret level, and a Top-Secret level. Here, a document that is ascribed as Non-Confidential may be suitable for any and all viewers within the entity or organization, and may include publically accessible information. Further, a document that is ascribed as Confidential may be suitable for wide distribution within the entity or organization, but may be limited in the scope of distribution, a document that is ascribed as Secret may be suitable for a more limited distribution within the entity or organization, and a document that is ascribed as Top-Secret may be suitable for only a select few viewers. It will be understood that an entity or organization that maintains document pool 102 as being classified by a hierarchical classification system will concurrently maintain a screening program for the individuals associated with the entity or organization in order to provide access level privileges to the individuals.

In another embodiment, the individual documents of document pool 102 are grouped by a grouping system. Here, each document of document pool 102 is ascribed as being associated with a particular group of the grouping system, and an individual's access to a particular document is granted when the individual is associated with the group that is ascribed to the document. For example, an entity or organization can be grouped according to the function of each group, such as marketing, manufacturing, sales, engineering, human resources, etc. Here, each document of document pool 102 can be ascribed one or more of a Marketing group, a Manufacturing group, a Sales group, an Engineering group, and a Human Resources group. As such, a document that is ascribed as Marketing may be suitable for distribution to workers within the marketing group, and so forth. In a particular case, each document of document pool 102 can be ascribed as being associated with more than one particular group of the grouping system, such that multiple groups may have access to each document.

In yet another embodiment, the individual documents of document pool 102 are both classified by a hierarchical classification system and grouped by a grouping system. In this case, each particular document is ascribed as being associated with a particular group of the grouping system, and is ascribed a particular classification level within the hierarchical classification system. Here, an individual's access to a particular document is granted when the individual is associated with the group that is ascribed to the document and the individual also has a clearance level that corresponds with the classification level of the document. Moreover, in the case where each document of document pool 102 can be ascribed as being associated with more than one particular group of the grouping system, each document can be ascribed a different classification level for each of the groups with which the documents are associated. For example, a design specification can be a Confidential document with respect to the Engineering group, but can be a Top-Secret document with respect to the Human Resources group.

New document 104 represents a document that has been created and that includes information that is desired to be controlled in terms of who has access to the information, and under what circumstances the access to the information can be granted. As such, new document 104 can represent any type of document as is included in document pool 102, but that has yet to have attributes ascribed to it that operate to control the access to the information contained therein. For example, new document 104 may not be ascribed to a classification level or to any group.

Document handler 110 represents a processing system that operates to evaluate the documents in document pool 102, to determine the topics, subjects, and content of the documents, and to associate the topics, subjects, and content with the documents' associated classifications and groupings. To this end, document handler 110 includes a topic cluster miner 120, a document correlator 130, and a class/group database 140. Topic cluster miner 120 operates to receive each document of document pool 102, and to evaluate information from each document to determine one or more topic cluster for each document. The information from a document can include the title or header information for the document, the content of the document, meta-data associated with the document, or other information related to the nature, content, and information included in the document. The topic clusters can be derived via a Term Frequency-Inverse Document Frequency (TF-IDF) analysis, a Latent Dirichlet Allocation (LDA) analysis, a Latent Semantic Indexing (LSI) analysis, another language processing analysis as is known in the art, or a combination thereof. As such, a topic cluster includes words, such as keywords, phrases, acronyms, and the like, ideas communicated by such words, but where the words are not necessarily correlated as a single word, phrase, acronym, or the like, or other types of topic clusters as identified by the language processing analysis. Document correlator 130 operates to evaluate the existing classifications and grouping for each document of document pool 102, and to correlate the classifications and groupings to the associated topic clusters for each document. Class/group database 140 operates as a repository for the correlated topic clusters, class associations, and group associations.

Document handler 110 further operates to generate statistics related to document pool 102. An example related statistics includes the number of documents of document pool 102 that include a particular topic cluster, the number of documents that include a particular topic cluster that are provided with a particular classification or grouping, or other statistics associated with document pool 102. In a particular embodiment, class/group database 140 can include a relative correlation factor that provides a strength of the correlation between a particular topic cluster and the number of associated documents that are associated with a particular classification or grouping. In this way, document handler 110 operates to provide a listing of the documents of document pool 102 that are mis-classified, or mis-grouped. For example, where a particular topic cluster, such as a code word, is strongly associated with a Top-Secret classification level, document handler 110 can generate a list of documents that include the particular topic cluster, but that are associated with a lower classification level than the Top-Secret level. Here, document handling administrator 115 receives the list and takes actions to ensure that the over- or under-classified document have their classification levels modified to the Top-Secret level. In a particular embodiment, document handling administrator 115 provides guidelines or thresholds to document handler 110, such that, when a particular document is identified as being mis-classified or mis-grouped, the document handler automatically modifies the documents to provide the appropriate classification level or grouping. Note that the present disclosure is not limited to determining topic clusters as particular words or ideas. In a particular embodiment, where a code word is strongly associated with a Top-Secret classification level, the absence of other words or ideas that are also associated with the Top-Secret classification level can act to reduce the need to classify a document as Top-Secret. For example, where "violin" is a code word for a Top-Secret project, a document that speaks of a user's child's violin recital may not be reclassified as Top-Secret.

In a particular embodiment, where one or more of the documents of document pool 102 includes a web page, such as a HTML document or includes embedded code such as Java or XML code, document handler 110 operates to make the evaluation for topic clusters on a more focused basis, such that the overall web page can be at a lower classification level or for a broader set of groups, but where certain portions of the web page are maintained at a higher classification level or for a narrower set of groups. Here, topic cluster miner 120 operates to distinguish between titles, headers, content, and meta data that are associated with the overall web page's appearance, and titles, headers, content, and meta data that is embedded in the web page or that provide hyperlinks to other titles, headers, content, and meta data. For example, where a general purpose web page includes a hyperlink with a title that is associated with a Top Secret topic, document handler 110 can modify the HTML code of the web page to display a blank area if the user viewing the page does not have the associated clearance level, or to substitute the hyper link with code to provide a pop-up menu to provide additional credentials before viewing the content associated with the hyper link.

Document handler 110 also operates to evaluate new document 104, to determine the topics, subjects, and content of the new document, and to ascribe an associated classification level and grouping to the new document based on the topics, subjects, and content. Here, topic cluster miner 120 operates to receive new document 104, and to evaluate information from the new document to determine one or more topic cluster for the new document. Document correlator 130 operates to evaluate the topic clusters for new document 104 to determine if any existing classification or grouping, as recorded in class/group database 140, is associated with the new document. If the topic cluster associated with new document 104 is included in class/group database 140, then document handler 110 operates to ascribe the associated classification level and grouping to the new document. On the other hand, if the topic cluster associated with new document 104 is not included in class/group database 140, then document handling administrator 115 receives an indication that the topic cluster is not included in the class/group database, and the document handling administrator ascribes a classification level and grouping to the new document. For example, were new document 104 is a first document to refer to a new named Top-Secret project, class/group database 140 will not include the name of the Top-Secret project, and will have no classification and grouping associations for the project name. Here, document handling administrator 115 will ascribe the proper classification and grouping to new document 104 to reflect the security needed for the new document. In a particular embodiment, document handling administrator 115 ascribes the proper classification and grouping to new document 104 by adding a new entry to class/group database 140, after which document handler 110 will be able to correctly ascribe the classification and grouping to the new document and any subsequent documents associated with the topic cluster. In another embodiment, document handling administrator 115 ascribes the proper classification and grouping to new document 104 directly, and document handler 110 will then evaluate the new document as part of document pool 102, and will thereby add a new entry to class/group database 140. Thereafter, document handler 110 will be able to correctly ascribe the classification and grouping to any subsequent documents associated with the topic cluster.

Figure 2:
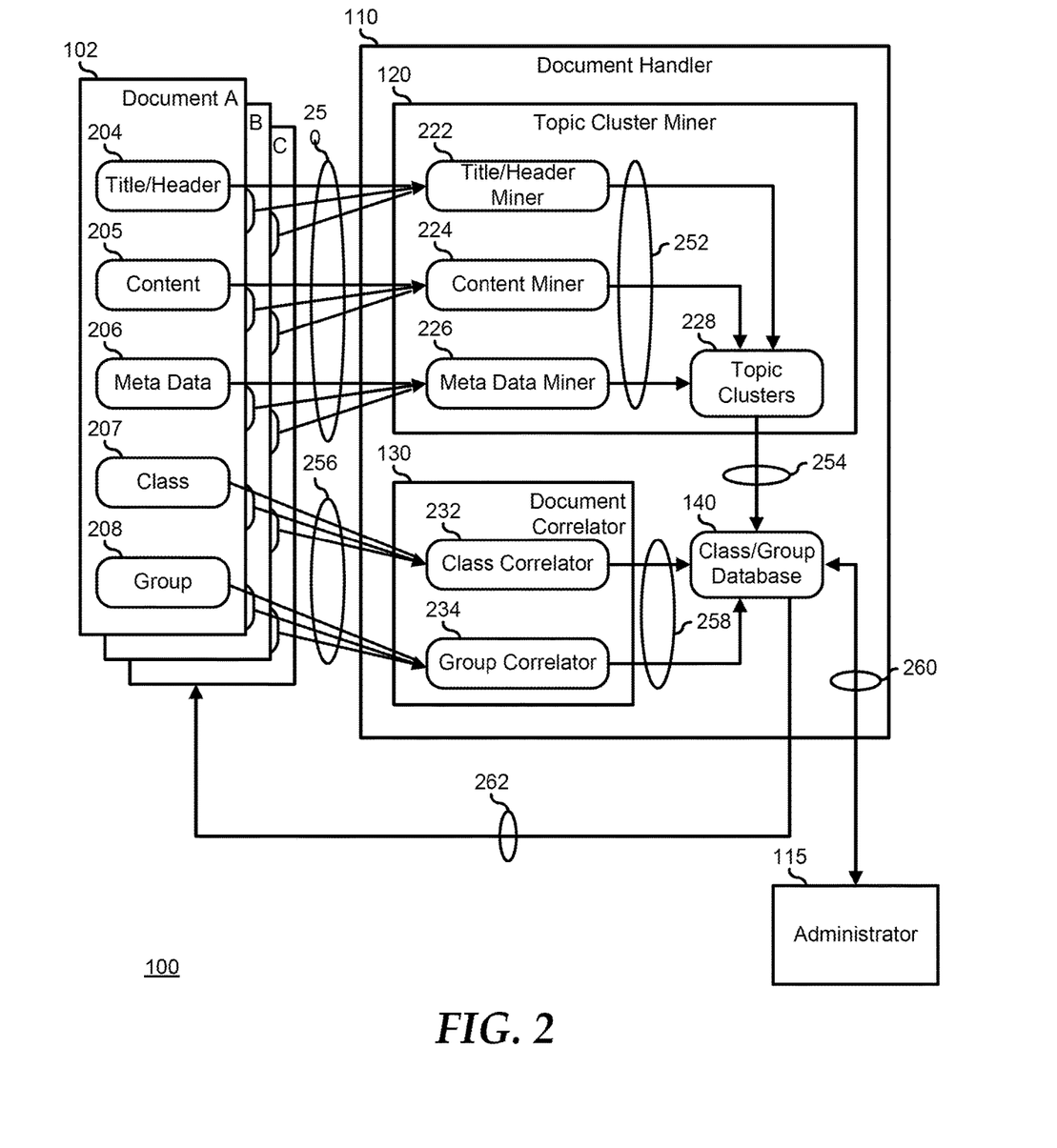
FIGS. 2-3 are block diagrams illustrating the document handling system of FIG. 1 and methods for automatic document classification and grouping based on document topic.

FIG. 2 illustrates document handling system 100, including details for a method for evaluating the topic clusters of document pool 102. Here, document pool 102 is illustrated as including documents A, B, and C. Each document includes title/header information 204, content 205, meta data information 206, a classification 207, and a grouping 208. Document cluster miner 120 includes a title/header miner 222, a content miner 224, a meta data miner 226, and a topic cluster aggregator 228. Document correlator 130 includes a class correlator 232 and a group correlator 234. In evaluating document pool 102, document handler 110 provides title/header information 204, content 205, and meta data information 206 for each of documents A, B, and C to the respective title/header miner 222, content miner 224, and meta data miner 226 in a method step 250. Each of miners 222, 224, and 226 operate to determine the topic clusters associated with each document, and to provide the topic clusters to topic cluster aggregator 228 in a method step 252. Topic cluster aggregator 228 provides the topic clusters to class/group database 140 in a method step 254.

In further evaluating document pool 102, document handler 110 provides classification 207, and grouping 208 to the respective class correlator 232 and group correlator 234 in a method step 256. Each of correlators 232 and 234 operate to determine the classifications and groupings to class/group database 140 in a method step 258. Document handler 110 provides a listing of the documents of document pool 102 that are mis-classified, or mis-grouped to document handling administrator 115 in a method step 260, and the document handling administrator directs the document handler to modify the mis-classified or mis-grouped documents.

Figure 3:
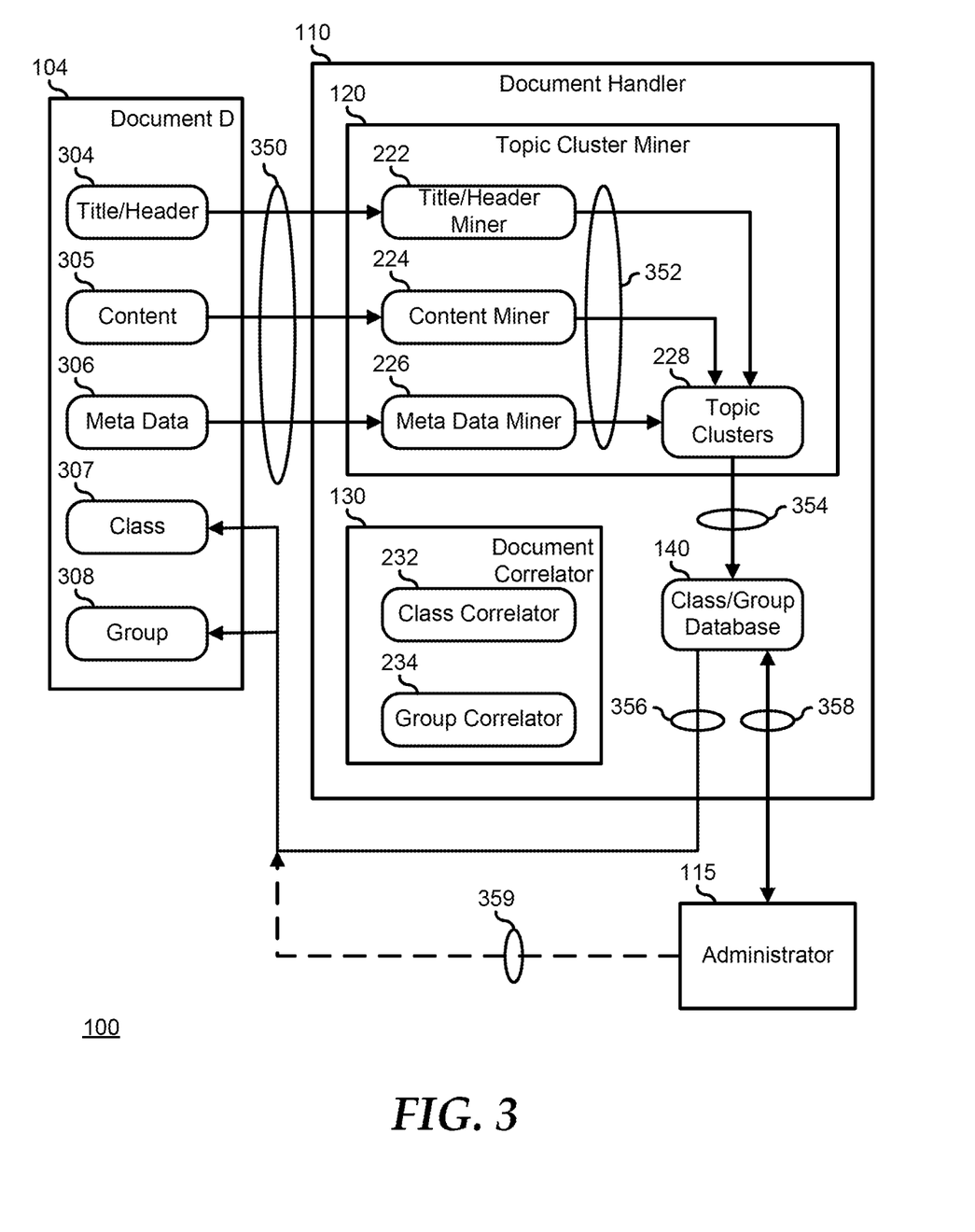

FIG. 3 illustrates document handling system 100, including details for a method for evaluating the topic clusters of new document 104. Here, new document 104 is illustrated as including title/header information 304, content 305, meta data information 306, a classification 307, and a grouping 308. In evaluating new document 104, document handler 110 provides title/header information 304, content 305, and meta data information 306 to the respective title/header miner 222, content miner 224, and meta data miner 226 in a method step 350. Each of miners 222, 224, and 226 operate to determine the topic clusters associated with new document 104, and to provide the topic clusters to topic cluster aggregator 228 in a method step 352. Topic cluster aggregator 228 provides the topic clusters to class/group database 140 in a method step 354.

Document handler 110 operates to evaluate the topic clusters for new document 104 to determine if any existing classification or grouping, as recorded in class/group database 140, is associated with the new document. If the topic cluster associated with new document 104 is included in class/group database 140, then document handler 110 operates to ascribe the associated classification level and grouping to the new document in a method step 356. On the other hand, if the topic cluster associated with new document 104 is not included in class/group database 140, then document handling administrator 115 receives an indication that the topic cluster is not included in the class/group database, and the document handling administrator ascribes a classification level and grouping to the new document in a method step 358. Here, document handling administrator 115 ascribes the proper classification and grouping to new document 104 by adding a new entry to class/group database 140, after which document handler 110 will be able to correctly ascribe the classification and grouping to the new document and any subsequent documents associated with the topic cluster. In the alternative, document handling administrator 115 ascribes the proper classification and grouping to new document 104 directly, as shown in method step 359, and document handler 110 will then evaluate the new document as part of document pool 102, and will thereby add a new entry to class/group database 140. Thereafter, document handler 110 will be able to correctly ascribe the classification and grouping to any subsequent documents associated with the topic cluster.

Figure 4:
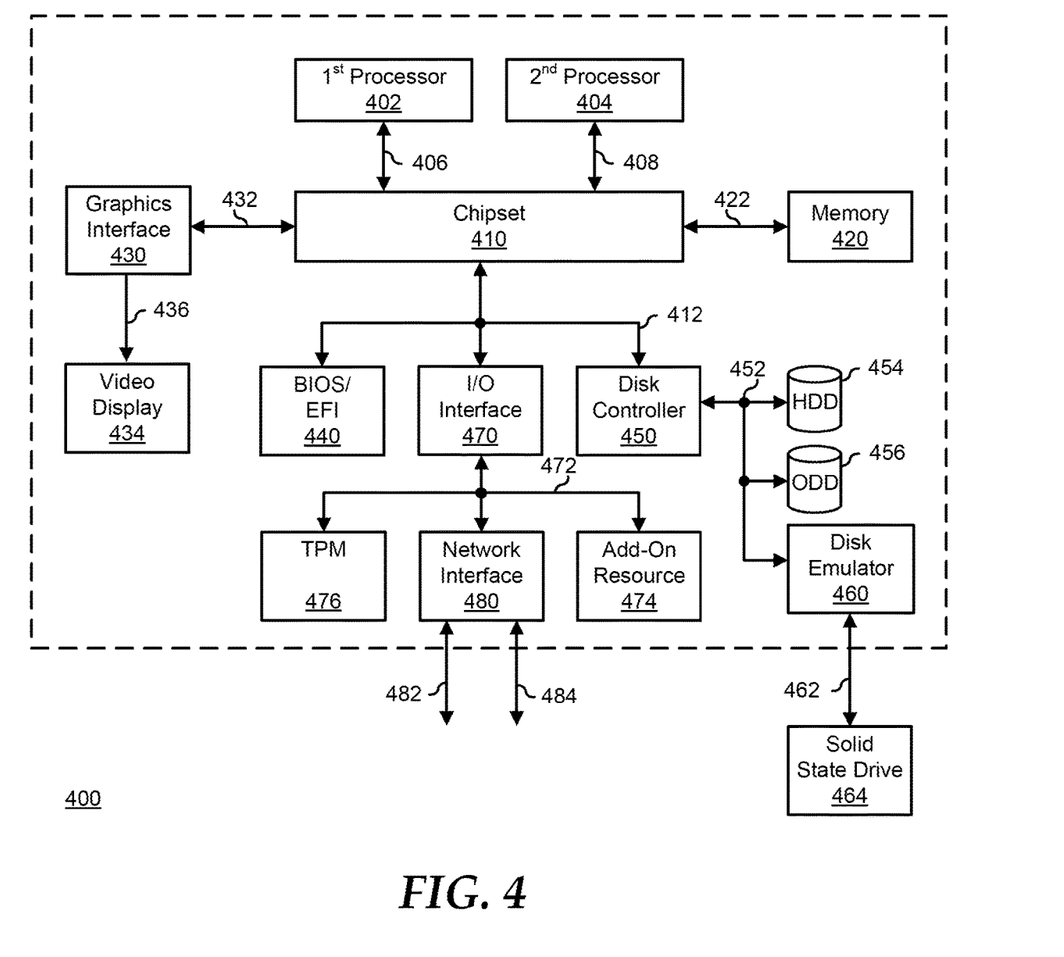
FIG. 4 is a block diagram illustrating a generalized information handling system according to an embodiment of the present disclosure.

FIG. 4 illustrates a generalized embodiment of information handling system 400. For purpose of this disclosure information handling system 400 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 400 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 400 can include processing resources for executing machine-executable code, such as a central processing unit (CPU), a programmable logic array (PLA), an embedded device such as a System-on-a-Chip (SoC), or other control logic hardware. Information handling system 400 can also include one or more computer-readable medium for storing machine-executable code, such as software or data. Additional components of information handling system 400 can include one or more storage devices that can store machine-executable code, one or more communications ports for communicating with external devices, and various input and output (I/O) devices, such as a keyboard, a mouse, and a video display. Information handling system 400 can also include one or more buses operable to transmit information between the various hardware components.

Information handling system 400 can include devices or modules that embody one or more of the devices or modules described above, and operates to perform one or more of the methods described above. Information handling system 400 includes a processors 402 and 404, a chipset 410, a memory 420, a graphics interface 430, include a basic input and output system/extensible firmware interface (BIOS/EFI) module 440, a disk controller 450, a disk emulator 460, an input/output (I/O) interface 470, and a network interface 480. Processor 402 is connected to chipset 410 via processor interface 406, and processor 404 is connected to the chipset via processor interface 408. Memory 420 is connected to chipset 410 via a memory bus 422. Graphics interface 430 is connected to chipset 410 via a graphics interface 432, and provides a video display output 436 to a video display 434. In a particular embodiment, information handling system 400 includes separate memories that are dedicated to each of processors 402 and 404 via separate memory interfaces. An example of memory 420 includes random access memory (RAM) such as static RAM (SRAM), dynamic RAM (DRAM), non-volatile RAM (NV-RAM), or the like, read only memory (ROM), another type of memory, or a combination thereof.

BIOS/EFI module 440, disk controller 450, and I/O interface 470 are connected to chipset 410 via an I/O channel 412. An example of I/O channel 412 includes a Peripheral Component Interconnect (PCI) interface, a PCI-Extended (PCI-X) interface, a high-speed PCI-Express (PCIe) interface, another industry standard or proprietary communication interface, or a combination thereof. Chipset 410 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. BIOS/EFI module 440 includes BIOS/EFI code operable to detect resources within information handling system 400, to provide drivers for the resources, initialize the resources, and access the resources. BIOS/EFI module 440 includes code that operates to detect resources within information handling system 400, to provide drivers for the resources, to initialize the resources, and to access the resources.

Disk controller 450 includes a disk interface 452 that connects the disc controller to a hard disk drive (HDD) 454, to an optical disk drive (ODD) 456, and to disk emulator 460. An example of disk interface 452 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 460 permits a solid-state drive 464 to be connected to information handling system 400 via an external interface 462. An example of external interface 462 includes a USB interface, an IEEE 1394 (Firewire) interface, a proprietary interface, or a combination thereof. Alternatively, solid-state drive 464 can be disposed within information handling system 400.

I/O interface 470 includes a peripheral interface 472 that connects the I/O interface to an add-on resource 474, to a TPM 476, and to network interface 480. Peripheral interface 472 can be the same type of interface as I/O channel 412, or can be a different type of interface. As such, I/O interface 470 extends the capacity of I/O channel 412 when peripheral interface 472 and the I/O channel are of the same type, and the I/O interface translates information from a format suitable to the I/O channel to a format suitable to the peripheral channel 472 when they are of a different type. Add-on resource 474 can include a data storage system, an additional graphics interface, a network interface card (NIC), a sound/video processing card, another add-on resource, or a combination thereof. Add-on resource 474 can be on a main circuit board, on separate circuit board or add-in card disposed within information handling system 400, a device that is external to the information handling system, or a combination thereof.

Network interface 480 represents a NIC disposed within information handling system 400, on a main circuit board of the information handling system, integrated onto another component such as chipset 410, in another suitable location, or a combination thereof. Network interface device 480 includes network channels 482 and 484 that provide interfaces to devices that are external to information handling system 400. In a particular embodiment, network channels 482 and 484 are of a different type than peripheral channel 472 and network interface 480 translates information from a format suitable to the peripheral channel to a format suitable to external devices. An example of network channels 482 and 484 includes InfiniBand channels, Fibre Channel channels, Gigabit Ethernet channels, proprietary channel architectures, or a combination thereof. Network channels 482 and 484 can be connected to external network resources (not illustrated). The network resource can include another information handling system, a data storage system, another network, a grid management system, another suitable resource, or a combination thereof.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A machine comprising:
a memory; and
a processor in communication with the memory, the processor to receive first information from a first document, determine that the first document includes a first topic cluster based on the first information, determine that a database includes the first topic cluster, determine a first classification level of the first document within a hierarchical classification system, wherein access of a user to the first document is granted when the user has a first clearance level that corresponds with the first classification level and determine a first grouping of the first document within a grouping system, wherein the access to the first document is granted when the user is associated with the first grouping, wherein determining the first classification level and the first grouping are based upon the database including an association of the first classification level and the first grouping with the first topic cluster, associate the first classification level and the first grouping with the first topic cluster, receive second information from a second document, determine that the second document includes the first topic cluster based on the second information, modify the second document to ascribe the first classification level and the first grouping to the second document in response to determining that the second document includes the first topic cluster, receive third information from a third document, determine that the third document is associated with the first classification level and the first grouping, determine that the third document includes a second topic cluster based on the third information, add the third topic cluster to the database, and grant access to the second document to a member of the first group, wherein the first document is determined to include the first topic cluster based upon a language processing analysis of the first information, the second document is determined to include the first topic cluster based upon the language processing analysis of the second information, and the third document is determined to include the second topic cluster based upon the language processing analysis of the third information.

2. The machine of claim 1, wherein the processor is further to determine that the first document comprises a web page, and, in modifying the second document, to modify a link of the web page.

3. The machine of claim 2, wherein in modifying the link the processor is further to determine that the link includes the first topic clustor.

4. The machine of claim 3, wherein in modifying the link the processor is further to delete the link in response to determining that the link includes the first topic clustor.

5. The document handling system of claim 3, wherein in modifying the link the processor is further to insert code into the first document to implement a pop-up window associated with the first topic in response to determining that the link includes the first topic clustor.

6. The machine of claim 1, the processor further to receive fourth information from a fourth document, determine that the fourth document includes the first topic based on the fourth information, and determine a second classification level of the fourth document.

7. The machine of claim 6, the processor further to provide a first indication that the first classification level associated with the first document is different from the second classification level associated with the fourth document, and receive a second indication to modify a selected one of the first document and the fourth document in response to providing the first indication.

8. The machine of claim 7, the processor further to modify the first document to ascribe the second classification level to the first document when the first document is selected, and to modify the fourth document a scribe the first classification level to the third document when the third document is selected.

9. The machine of claim 1, wherein the language processing analysis includes one of a Term Frequency-Inverse Document Frequency (TF-IDF) analysis, a Latent Dirichlet Allocation (LDA) analysis and a Latent Semantic Indexing (LSI) analysis.

10. A method comprising:
receiving, at a document handling system, first information from a first document;
determining that the first document includes a first topic based on the first information;
determining that a database includes the first topic cluster;
determining a first classification level of the first document within a hierarchical classification system, wherein access of a user to the first document is granted when the user has a first clearance level that corresponds with the first classification level and determining a first grouping of the first document within a grouping system, wherein the access to the first document is granted when the user is associated with the first grouping, wherein determining the first classification level and the first grouping are based upon the database including an association of the first classification level and the first grouping with the first topic cluster;
associating the first classification level and the first grouping with the first topic;
receiving second information from a second document;

determining that the second document includes the first topic based on the second information; and modifying the second document to ascribe the first classification level and the first grouping to the second document in response to determining that the second document includes the first topic clustor;

receiving third information from a third document;

determining that the third document is associated with the first classification level and the first grouping;

determining that the third document includes a second topic cluster based on the third information;

adding the third topic cluster to the database; and granting access to the second document to a member of the first group, wherein the first document is determined to include the first topic cluster based upon a language processing analysis of the first information, the second document is determined to include the first topic cluster based upon the language processing analysis of the second information, and the third document is determined to include the second topic cluster based upon the language processing analysis of the third information.

11. The method of claim 10, further comprising:
determining that the first document comprises a web page;
wherein modifying the second document further comprises modifying a link of the web page.

12. The method of claim 11, further comprising:
determining that the link includes the first topic clustor.

13. The method of claim 12, further comprising:
deleting the link in response to determining that the link includes the first topic clustor.

14. The method of claim 12, further comprising:
inserting code into the first document to implement a pop-up window associated with the first topic in response to determining that the link includes the first topic clustor.

15. The method of claim 10, further comprising:
receiving third information from a fourth document;
determining that the fourth document includes the first topic based on the fourth information; and
determining a second classification level of the fourth document.

16. The method of claim 15, further comprising:
providing a first indication that the first classification level associated with the first document is different from the second classification level associated with the fourth document; and
receiving a second indication to modify a selected one of the first document and the fourth document in response to providing the first indication.

17. The method of claim 16, further comprising:
modifying the first document to ascribe the second classification level to the first document when the first document is selected; and
modifying the third document to ascribe the first classification level to the third document when the third document is selected.

18. The method of claim 10, wherein the language processing analysis includes one of a Term Frequency-Inverse Document Frequency (TF-IDF) analysis, a Latent Dirichlet Allocation (LDA) analysis and a Latent Semantic Indexing (LSI) analysis.

19. A non-transitory computer-readable medium including code for performing a process, the process comprising:
receiving first information from a first document;
determining that the first document includes a first topic cluster based on the first information;
determining that a database includes the first topic cluster;
determining a first classification level of the first document within a hierarchical classification system, wherein access to the first document is granted when a user has a first clearance level that corresponds with the first classification level and determining a first grouping of the first document within a grouping system, wherein the access to the first document is granted when the user is associated with the first grouping, wherein determining the first classification level and the first grouping are based upon the database including an association of the first classification level and the first grouping with the first topic cluster;
associating the first classification level and the first grouping with the first topic cluster;
receiving second information from a second document;
determining that the second document includes the first topic cluster based on the second information;
modifying the second document to ascribe the first classification level and the first grouping to the second document in response to determining that the second document includes the first topic cluster;
receiving third information from a third document;
determining that the third document is associated with the first classification level and the first grouping;
determining that the third document includes a second topic cluster based on the third information;
adding the third topic cluster to the database; and
granting access to the second document to a member of the first group, wherein the first document is determined to include the first topic cluster based upon a language processing analysis of the first information, the second document is determined to include the first topic cluster based upon the language processing analysis of the second information, and the third document is determined to include the second topic cluster based upon the language processing analysis of the third information.

20. The computer-readable medium of claim 19, wherein the language processing analysis includes one of a Term Frequency-Inverse Document Frequency (TF- IDF) analysis, a Latent Dirichlet Allocation (LDA) analysis and a Latent Semantic Indexing (LSI) analysis.

* * * * *

UNITED STATES PATENT AND TRADEMARK OFFICE
CERTIFICATE OF CORRECTION

PATENT NO. : 10,657,186 B2  
APPLICATION NO. : 14/725620  
DATED : May 19, 2020  
INVENTOR(S) : Carrie E. Gates Page 1 of 1

It is certified that error appears in the above-identified patent and that said Letters Patent is hereby corrected as shown below:

In the Claims

Column 10, Line 13: Please change "clustor" to --cluster--
Column 10, Line 16: Please change "clustor" to --cluster--
Column 10, Line 17: Please change "document handling system" to --machine--
Column 10, Line 20: Please change "first topic in" to --first topic cluster in--
Column 10, Line 21: Please change "clustor" to --cluster--
Column 10, Line 24: Please change "first topic based" to --first topic cluster based--
Column 10, Line 37: Please change "document a scribe" to --document to ascribe--
Column 10, Line 45: Please change "A method comprising" to --A process comprising--
Column 10, Lines 48-49: Please change "first topic based" to --first topic cluster based--
Column 10, Line 65: Please change "first topic;" to --first topic cluster;--
Column 11, Lines 1-2: Please change "first topic based" to --first topic cluster based--
Column 11, Lines 2: Please change "information; and" to --information;--
Column 11, Line 6: Please change "clustor" to --cluster--
Column 11, Line 23: Please change "method" to --process--
Column 11, Line 27: Please change "method" to --process--
Column 11, Line 28: Please change "clustor" to --cluster--
Column 11, Line 29: Please change "method" to --process--
Column 11, Line 31: Please change "clustor" to --cluster--
Column 11, Line 32: Please change "method" to --process--
Column 11, Line 34: Please change "first topic in" to --first topic cluster in--
Column 11, Line 36: Please change "clustor" to --cluster--
Column 11, Line 37: Please change "method" to --process--
Column 11, Line 38: Please change "third information" to --fourth information--
Column 11, Lines 39-40: Please change "first topic based" to --first topic cluster based--
Column 11, Line 43: Please change "method" to --process--
Column 11, Line 51: Please change "method" to --process--

Signed and Sealed this  
Seventeenth Day of November, 2020

Andrei Iancu  
*Director of the United States Patent and Trademark Office*